United States Patent [19]

Amos

[11] Patent Number: 4,541,621

[45] Date of Patent: Sep. 17, 1985

[54] PORTABLE WELDING JIG

[76] Inventor: Alvin W. Amos, Rte. 11, Box 241-A, Bakersfield, Calif. 93308

[21] Appl. No.: 481,451

[22] Filed: Apr. 1, 1983

[51] Int. Cl.⁴ .............................................. B23Q 1/04
[52] U.S. Cl. ....................................... 269/51; 269/63; 269/69; 269/71; 269/76; 269/43
[58] Field of Search .............................. 269/17, 60–61, 269/63, 69, 71, 76, 902, 50–51, 43; 228/49 B, 44.5; 33/379–384

[56] References Cited

U.S. PATENT DOCUMENTS

| | | | |
|---|---|---|---|
| 1,414,970 | 5/1922 | Nelson | 269/60 |
| 2,479,623 | 8/1949 | Johnson | 269/17 |
| 2,483,811 | 10/1949 | Cullen | 269/71 |
| 2,654,147 | 10/1953 | Wilson et al. | 269/60 |
| 2,988,354 | 6/1961 | Schultz | 269/60 |
| 3,048,387 | 8/1962 | Waggoner | 269/76 |
| 3,298,681 | 1/1967 | Youngblood | 269/69 |
| 3,499,225 | 3/1970 | Darrah | 33/379 |
| 4,145,006 | 3/1979 | Webb | 269/76 |

*Primary Examiner*—Robert C. Watson
*Attorney, Agent, or Firm*—Hughes, Barnard & Cassidy

[57] ABSTRACT

A portable welding jig, for positioning and manipulating a workpiece, configured for pipe-flange welding at remote locations and capable of establishing automatically a two-holed flange configuration, is comprised of a rotatable shaft adjustably secured to a support, wherein the shaft rotates about a longitudinal work axis, and an adjustment member for orienting the shaft in a positioning plane containing the work axis; a flange mounting member depending from the distal end of the shaft, including a flange mounting plate member for receiving a flange and presenting same for rotation about the work axis in a working plane generally normal to the positioning plane; and indexing members for locating a flange borne upon the mounting plate in a two-holed configuration within the plane. The indexing members include a lateral leveling member rotatable concentrically with respect to the shaft and having a reference inscription thereon for establishing a reference location when the lateral leveling member is leveled horizontally to define a leveling plane generally normal to both the positioning and working planes, and an array of indexing inscriptions associated with the shaft and disposed at preselected positions corresponding to fixed angular orientations of the shaft, one of each of the indexing inscriptions in the array relating to a predetermined flange size, whereby registration of an appropriate indexing inscription with the reference inscription at the reference location correlates the angular position of the shaft to present the flange in a two-holed orientation within the working plane.

10 Claims, 7 Drawing Figures

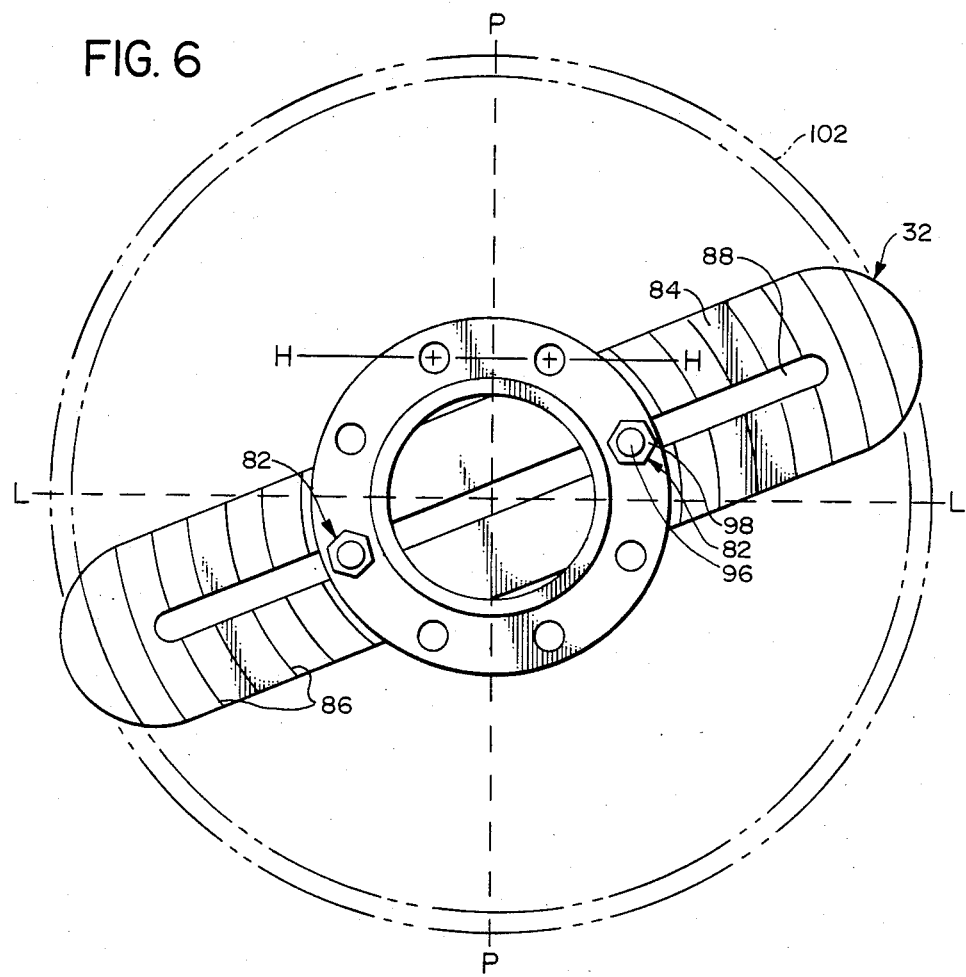
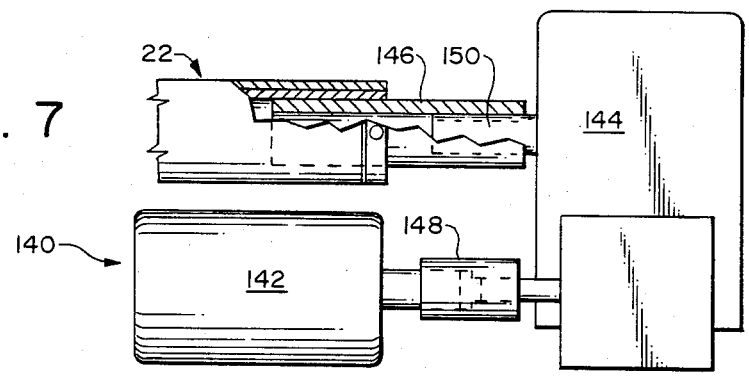

PORTABLE WELDING JIG

BACKGROUND OF THE INVENTION

1. Field of the Invention

The present invention relates, generally, to welding jigs; more especially to pipe flange welding jigs; and still more specifically to pipe flange welding jigs which have portable mobility and may be used to fabricate piping systems at remote field locations such as oil and gas exploration fields. The present invention also relates to methods for automatically presenting a pipe flange in a two-holed configuration.

2. Description of the Background Art

Welding jigs, and similar workpiece positioning tables and manipulators, are well known and have been devised in all manner of shapes and sizes. The common thread among devices heretofore proposed is the ability to restrain a workpiece in a desirable position and then manipulate that workpiece during a fabrication technique in a way which enhances production efficiency while maintaining accurate alignment of the components being assembled. A particularly commonplace environment for these types of devices is in the welding fabrication of, e.g., pipes and associated fittings; especially in the pre-fabrication of individual segments destined to comprise a fluid flow system.

In the context of pipe welding, the components invariably have a circular configuration where, typically, a pipe flange or similar terminal member must be secured to a length of pipe. It is crucial that the welding technique yields an effective joint which will be reliable in service. A welding jig or positioning table materially enchances the ability to achieve that aim; with two paramount aspects in mind.

First, most welders find their individual technique to be better laying a bead along a horizontal or substantially horizontal line when welding from above the work while, on the contrary, welding overhead poses greater difficulty. Intermediate difficulty is presented when laying a bead along a vertical; but that degree of difficulty is somewhat exacerbated when the vertical bead includes an arcuate component. Accordingly, welding jigs or similar work-positioning tables strive to present the workpiece in a manner allowing for its rotation during the welding procedure so that the welder may assume the most comfortable position vis-a-vis the work and manipulate the latter so that he or she is operating most efficiently.

The second conceptual aspect of importance in this arena is insuring the accurate lay-up of components during the welding procedure. Where one is called upon to fabricate a number of individual components, adding flanges, fittings, or the like to lengths of pipe, it is obviously crucial that the appropriate orientation from one component to another be maintained so that the finished, assembled product corresponds to the overall specifications of the piping system. This is a task easier said than done where pipes having elbows of various curvature, fittings of reduced or enlarged dimensions, valves and the like are fabricated individually but must ultimately piece together in a coherent, pre-established configuration. Positioning control during the welding process is the key to success or failure in this task.

It is now conventional to lay-up a pipe flange in a so-called "two-holed" configuration in order to maintain adequate and accurate alignment from one component to another ultimately to be assembled into a completed system. In capsule sum, a two-holed configuration simply refers to the alignment of the top two holes in the flange along a perfectly horizontal line. Then, when that flange is mated with an adjacent one for assembly, the flanges will align properly, and referencing all other components from this horizontal line will insure proper orientation thereof. Achieving this two-holed orientation reliably and accurately from component to component can be a very tedious endeavor.

All of the foregoing difficulties are compounded when the fabrication technique is to take place at a remote location, such as an oil or gas exploration field. In that environment the welder transports the shop to the field; carrying a portable welder, clamps, vises and other associated tools needed to assemble the piping system. The only available workplace is oftentimes the tail-gate of a truck; yet, under these less-than-desirable conditions, accuracy from piece to piece cannot be sacrificed.

Many have proposed welding jigs or similar positioners which are admirably suited for welding pipes, but most of which are limited to shop use and are ill-suited for field welding. Somewhat representative of one approach is the welding jig disclosed in U.S. Pat. No. 3,848,863. That apparatus is comprised of a pair of rails much like railroad tracks which support two movable carriages thereon. Pipe supports are located between the rails and are reciprocable between raised and lowered positions. Powered rollers associated with the support provide means to rotate a pipe during the welding process when joining it to a fitting such as a flange. Means are provided to adapt the device for welding fittings of various sizes and shapes in addition to flanges, including "T's", reducers, elbows and the like. Other apparatus of the same ilk, where plural stations are established by carriages or carriage-type members movable along tracks, are disclosed in U.S. Pat. Nos. 3,772,753 and 3,870,288. While these devices undoubtedly are highly suitable for their intended purposes, the same are conceptually ill-suited for use at remote locations where the importance of portable mobility is on a par with reliability and expediency. Simply put, these types of devices are too cumbersome, too complex, and are not adaptable for use, for example, in an exploration field where fabrication tends to be on an ad hoc as opposed to a production basis.

While there are other designs which admit of considerably simpler construction, such as those welding jigs disclosed in U.S. Pat. Nos. 2,909,137 and 3,239,209, none of the known prior devices can provide the combination of the necessary high degree of portable mobility with the desirability of precision lay-up. Further along these lines, no known apparatus can provide the advantages immediately aforesaid while also providing automatic indexing to present a pipe flange in the two-holed configuration repetitively and reliably; thereby eliminating a chronic source of rejects due to improper lay-up of components. Accordingly, the need exists for such a welding jig.

SUMMARY OF THE INVENTION

The present invention advantageously provides a portable welding jig which serves as work positioning and manipulating means configured for pipe flange welding at remote field locations and which is also capable of establishing automatically a two-holed flange configuration. The welding jig of the present invention is particularly desirable for its simplicity of construction yet reliability in use, whereby pipe fittings may be welded expediently under the most adverse of field conditions. The instant welding jig is further remarkable for its wide range of adaptability as a work positioner, allowing manipulation of a workpiece of complex geometry in the field for accurate alignment of components comprising a subassembly to be fabricated.

These and other advantages of the present invention are realized by a portable welding jig particularly configured for pipe flange welding at remote field locations and which is capable of establishing automatically a two-holed flange configuration; which welding jig comprises a base, preferably associated with a vehicle, supporting a work positioning and manipulating means. The work positioning and manipulating means include a rotatable shaft means adjustably secured to the support, having a longitudinal work axis about which the shaft may rotate, and adjustment means for orienting that shaft in a positioning plane containing the longitudinal work axis. A flange mounting means depends from the distal end of the shaft means and includes a flange mounting plate means for receiving a pipe flange and presenting same for rotation about the work axis in a working plane generally normal to the positioning plane. The work positioning and manipulating means also includes an indexing means for locating a flange borne upon the mounting plate means in a two-holed configuration within the working plane. The indexing means comprises lateral leveling means rotatable concentrically with respect to the shaft and having a reference inscription thereon to establish a reference location when said leveling means is leveled horizontally to define a leveling plane normal to both the positioning and working planes. The shaft itself has associated therewith, directly or indirectly, an array of indexing inscriptions disposed at preselected positions corresponding to fixed angular orientations of the shaft, one of each of these indexing inscriptions in the array being related to a predetermined flange size. Leveling the lateral leveling means and then rotating the shaft to present the appropriate one of the indexing inscriptions in registration with the inscription automatically presents a pipe flange secured to the mounting means in a two-holed configuration.

In a preferred form of the invention, the base is secured to and supported on a vehicle, such as a pick-up or flatbed truck. In turn, the rotatable shaft means is preferably pivotally secured near its distal end to the base so that it may be adjusted vertically in the positioning plane, either for the purpose of leveling the positioning and manipulating means or for presenting the work at a more convenient location. Adjustment is preferably achieved by securing the shaft to the base support by means of an adjustable fastener disposed intermediate the length of or proximate the distal end of the shaft.

The flange mounting plate means preferably includes adjustable fixture means for securing pipe flanges of varying diameters to the jig. In a preferred form of the invention, a pair of studs are disposed within elongated slots in the plate and captured by a track, preferably formed by an inverted channel generally coincident with the slots, allowing for radial adjustment to accommodate different flanges. The positioning plate is preferably provided with an array of arcuate inscriptions, serving as locating marks for assisting in the proper positioning of the flange concentric with the longitudinal work axis of the apparatus. Further along these general summary lines, the fixture studs may take a number of different forms for variations in the sizes of the flange to be supported thereby; taking into account the standard sizes for pipe flanges on the one hand and standardization of the welding jig of the present invention on the other hand. Thus, in some instances where the fixture holes on the flange tend to be relatively large, an insert or spacer means is provided for association with the adjustable fixture studs of the jig. Where the flange mounting holes are rather small, a stepped fixture stud is employed, the head thereof captured in the track, a shoulder disposed within the slot, and a reduced diameter threaded end employed to secure the flange to the jig.

The shaft is free to rotate and thereby rotate the work during a welding procedure. In one embodiment of the invention, the mounting plate is provided with handle means for rotating the plate; in an alternate embodiment, a rotation ring is provided to present a continuous handle member for the operator to use for rotation of the work during welding. In yet another embodiment, the jig of the present invention is provided with means for driving the shaft in order to relieve the operator of that task during a welding procedure. Most preferably, an hydraulic motor and gear reducer are utilized to drive the shaft and, hence, the workpiece over an adjustable range of from about 0.05 to about 2.0 revolutions per minute.

Other advantages of the welding jig of the present invention, and a fuller appreciation of structure and mode of operation, will be gained upon an examination of the following detailed description, taken in conjunction with the figures of drawing wherein:

BRIEF DESCRIPTION OF THE DRAWINGS

FIG. 6 is a front elevation view of the welding jig of FIG. 1, shown with a continuous rotating ring in phantom lines; and, FIG. 7 is a schematic view illustrating a means for powering the jig in accordance with the present invention in order to rotate the same automatically as opposed to manually.

DETAILED DESCRIPTION OF THE PRESENT INVENTION

The present invention relates, generally, to a welding jig and, more especially, to a portable welding jig which provides work positioning and manipulating means configured for pipe-flange welding at a remote field location such as an oil or gas exploration field. Accordingly, the invention will now be described with reference to certain preferred embodiments within the aforementioned contexts; although those skilled in the art will appreciate that such a description is meant to be exemplary only and should not be deemed limitative.

The idyllic conditions of shop frabrication of pipe components or segments, ultimately to be associated into a desired flow conduit, cannot be met in the field. Yet, there is no lesser demand in this more remote environment for accuracy in the lay-up of the pipe components and reliability and efficiency in the welding procedure employed, e.g., to secure a flange to a pipe. It is not at all uncommon for a pipe fabricator to be required to construct fairly convoluted or complexly shaped piping systems on an ad hoc basis to met the exigencies of a specific application. But, taking measurements and returning to the shop to construct the piping system is not a viable alternative to on-site fabrication. With these thoughts in mind, the present invention provides a welding jig having excellent portable mobility, which can be easily associated with the bed of a pick-up or flatbed truck used to transport the portable welder to the field; and nonetheless provide a durable and efficient jig which allows for the very accurate alignment and fabrication of pipe systems under these less than ideal circumstances.

Figure 1:
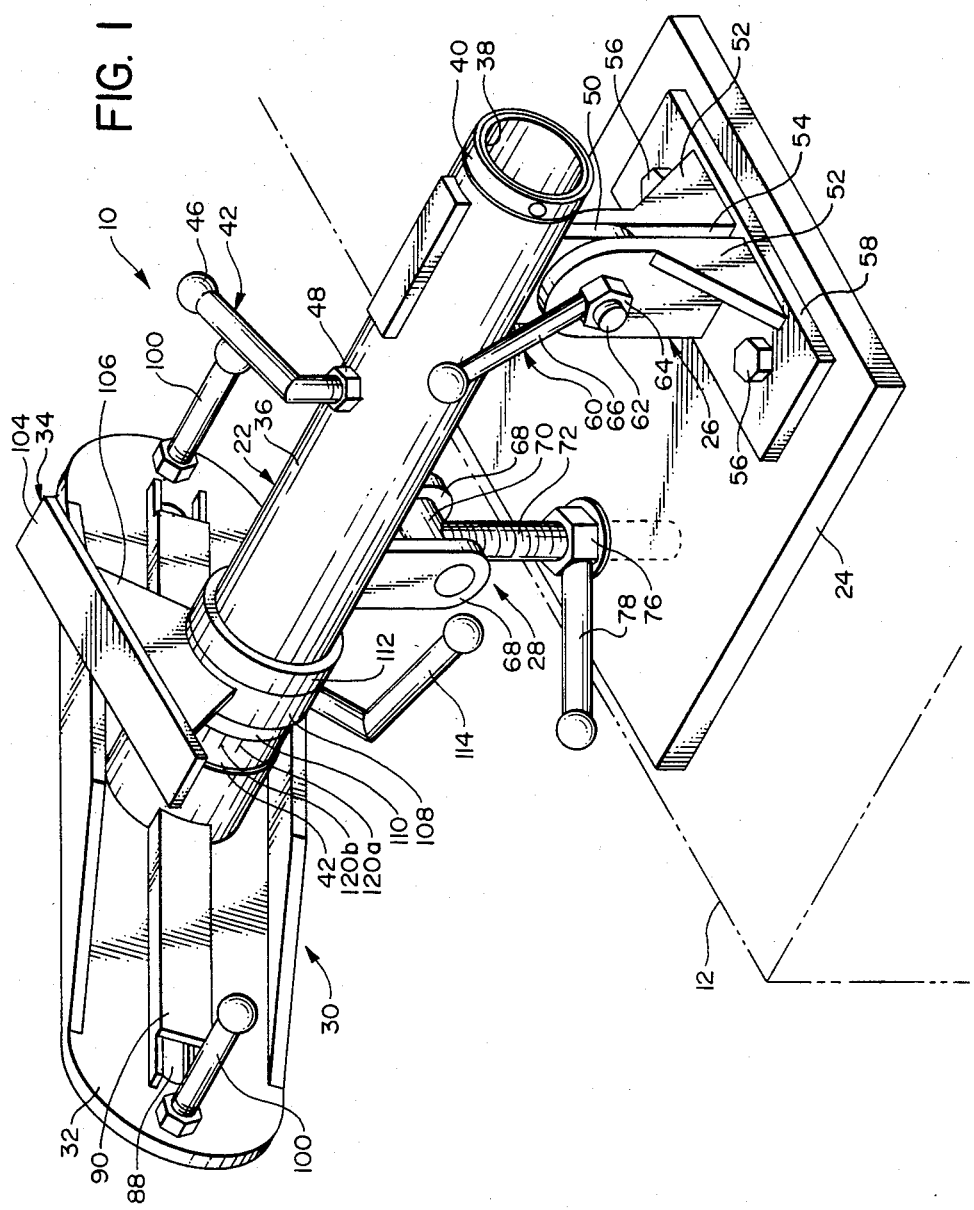
FIG. 1 is an isometric view of a preferred embodiment of a welding jig in accordance with the present invention.
Figure 2:
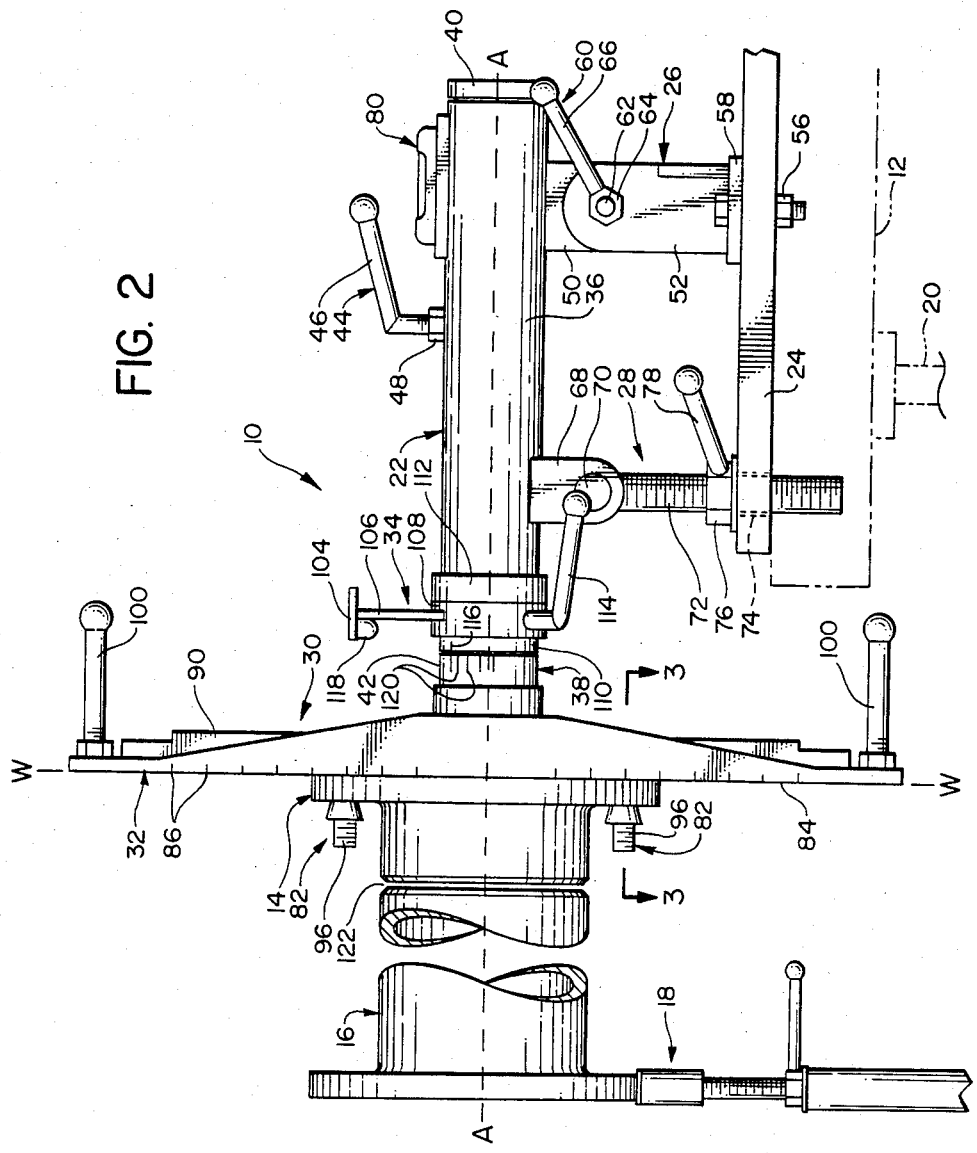
FIG. 2 is a side elevation view of the welding jig of FIG. 1, shown supporting a pipe flange to be fitted to a pipe.

Turning to the figures of drawing, in all of which like parts are identified with like reference numerals, FIGS. 1 and 2 illustrate a preferred embodiment of a welding jig in accordance with the present invention, designated generally as 10, supported on the bed area 12 (shown in phantom lines) of a truck (not shown). The jig 10 is illustrated to be receiving a pipe flange designated generally as 14 destined to be joined to a pipe designated generally as 16, which is supported at its distal end by a roller support means designated generally as 18. Preferably, the rear bed area 12 is supported on jack means 20, shown in phantom lines, to neutralize the suspension system of the vehicle so that a solid foundation for the jig 10 is thereby provided.

The portable welding jig 10 is comprised of a rotatable shaft designated generally as 22 adjustably mounted on support means 24, and secured for rotation about a longitudinal work axis identified A-A in FIG. 2. In the embodiment illustrated, the support means 24 is a plate, such as a steel plate, secured to the bed area 12 in any convenient fashion. The shaft 22 is preferably pivotally supported on the plate 24 at a pivotal joint 26, allowing the shaft to move along a generally arcuate line defining a positioning plane identified P-P in FIG. 4 containing the work axis. A shaft adjustment means 28 secures the shaft to the plate 24 forward of the pivot 26 while providing a means for controlling the angular orientation of the shaft in the positioning plane. A flange mounting means identified generally as 30 depends from the distal end of the shaft means 22, and includes a flange mounting plate means 32 for receiving flange 14 and presenting same for rotation about the work axis A-A in a working plane W-W generally normal to the positioning plane P-P. An indexing means identified generally as 34 is provided for locating the flange 14 in a two-holed configuration within the working plane W-W as described more fully hereinbelow.

In the preferred form of the jig shown in the figures of drawing, the shaft means 22 is comprised of an outer barrel or cylindrical sleeve 36 which receives a shaft 38 for rotation therein. The shaft 38, which has an outer diameter only slightly less than the inner diameter of the barrel 36, is restrained against longitudinal movement at its proximal end by a shaft ring 40 and at its distal end by a stepped surface 42 which might be provided, e.g., by a swedged ring, a step remaining from a machining operation, etc. In this exemplary embodiment, the barrel is illustrated as a unitary tube supporting the shaft. Alternately, the barrel may be segmented or reduced to relatively short sleeves and include beaings supporting the shaft. In any event, the shaft 38 is free to rotate within the barrel 36 or similar shaft support means about the work axis A-A. Optionally, but preferably, a grease fitting may be included on the barrel to provide lubrication for the mating surface between the shaft 38 and barrel 36. A shaft locking means 44 is provided on the barrel 36 in order to secure the shaft against rotation when that is desirable, e.g., when mounting a flange. In the embodiment shown, the locking means 44 is comprised of a handle 46 threaded at its lower end for receipt within a nut 48 secured to the barrel 36. An aperture through the barrel in registration with the nut 48 allows the lower end of the handle 46 to be rotated into engagement with the surface of shaft 38 against the restraining force of the nut 48, thereby locking the shaft and preventing rotation.

The barrel 36 is supported for vertically pivotal rotation about pivot joint 26. For this purpose, a plate 50 is joined to the barrel 36 along the lower edge and near the proximal end thereof. The plate 50 projects downwardly between a pair of opposed brackets 52 defining a channel 54 therebetween. The brackets 52 are affixed to the base plate 24 in any convenient fashion, such as by means of fixture bolts 56 passing through a horizontal leg 58 in each of these bracket members. Obviously, the brackets 52 might be secured in any other convenient way, such as, e.g., by welding to the base plate 24. A series of registering apertures is formed through the brackets 52 and the plate 50 to receive a locking axle means designated generally as 60. In the preferred form shown, the locking axle means 60 is comprised of a bolt 62 having a threaded end and a cooperating nut 64 from which extends a handle 66. When the nut 64 is loosened by manipulation of the handle 66, the joint 26 is free for pivotal rotation of the shaft means 22 about the axle pin or bolt 62 permitting adjustment of the mounting plate 32 to a desired orientation.

This range of movement is controlled by the adjustment means 28. In the form of the jig shown in FIGS. 1 and 2, a pair of downwardly extending plates 68 are secured to the lower edge of the barrel 36 intermediate the length but nearer the distal end thereof. The plates 68 are disposed in spaced relationship as viewed, for example, in FIG. 1, to yield a gap therebetween. A pair of registering apertures are formed in the plate 68 for receipt of an axle pin 70 which is headed at either end or otherwise restrained by the plates and which bridges the gap therebetween permitting for relative rotation of the pin with respect to the barrel. A threaded fixture bolt 72 is secured to the pin 70, projecting downwardly therefrom into engagement with the base or support plate 24. Preferably, the support plate 24 is formed with an oversized aperture 74 through which the bolt may pass. A nut 76 is received in threaded engagement on the bolt 72 and includes a handle means 78 to provide for convenient rotation thereof. As can best be seen with reference to FIGS. 1 and 2, rotation of the nut 76 while engaged with (e.g., resting upon) the top face of plate 24 will cause the bolt 72 to move upwardly or downwardly with respect thereto, thereby adjusting the pitch of the shaft means 22 within the positioning plane P-P. The axle pin 70 allows for arcuate motion of the shaft in response to the generally linear motion of the adjustment bolt 72; the range of which is dictated by the length of the bolt which can be selected to accommodate the anticipated range of motion. As the most common need for adjustment of the shaft is horizontal leveling for proper orientation of the work axis, a level means 80, such as an ordinary bubble level, is preferably secured to the barrel 36 at a convenient position to assist in the accurate alignment of the shaft 22.

The flange 14 is received on the flange mounting means 30; secured thereto by adjustable fixture means 82 mating with a face surface 84 of the mounting plate 32. Centering of the flange 18 on the plate 32 is important to insure that the flange is rotated about the work axis A-A. This centering is made somewhat easier by a plurality of centering marks or lines 86 inscribed in the face 84 of the plate and, if desirable, along the side edges thereof. The lines 86 are preferably arcuate lines disposed in an array, with e.g., ½ inch or 1 inch separation, corresponding to the average dimensions of standard size flanges. For example, for a flange having a base diameter of 12 inches, the inscriptions or centering marks 86 located 6 inches from center on either end of the plate 32 will permit accurate centering of that flange on the plate which, once so positioned, will be secured thereto by the adjustable fixture means 82.

Figure 3:
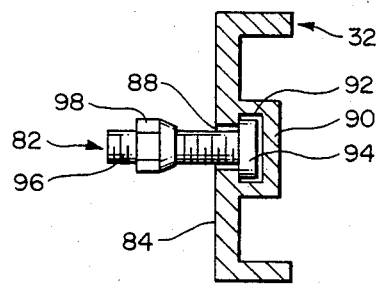
FIG. 3 is a sectional view, taken substantially along the line 3—3 of FIG. 2, showing a fixture stud for securing a pipe flange to the welding jig of the present invention.

One of these adjustable fixtures means 82 is shown in detail in FIG. 3, best envisioned with further reference to FIG. 6. The plate 32 is formed with a central slot 88 extending radially along the longitudinal axis thereof. The rear side of the plate 32 includes a box-type channel member 90 inverted to yield a track 92 within which is received the head 94 of a threaded bolt 96. Thus, the bolts 96 comprising the adjustable fixture means are free to move along the full extent of the slot 88 in order to assume a position coincident with the bolt holes in a flange 14 to be welded to pipe 16. With the bolts 96 appropriately positioned and the flange disposed thereover, tapered nuts 98 secure the flange thereon. The tapered nuts 98 are preferred to account for variations in the size of the bolt holes from one flange size to another; a feature considered in somewhat greater detail below.

With the flange secured in position as shown, e.g., in FIG. 2, the operator may rotate the mounting plate about the work axis A-A. To assist in this manipulation, the mounting plate may include rotation handles 100 at either end thereof or, for greater convenience, a continuous rotation ring 102 as shown in phantom lines in FIG. 4 may be employed. Other options along these lines are considered in further detail below.

An important advantage of the present invention is its ability to achieve automatically a two-holed configuration for the flange 14 which, in turn, assists in the appropriate alignment of individual components parts of the piping system ultimately to be produced. This automatic feature is provided, in part, by indexing means 34.

The indexing means 34 comprises a leveling table 104 supported by a plate 106 on a ring 108 disposed for concentric rotation about the shaft means 22. Preferably, the ring 108 has a circumferential skirt 110 extending along the axis of the shaft 22 into generally butting engagement with the stepped surface 42. An index table holding ring 112 is preferably affixed to the barrel 36 to prevent displacement of the ring 108; which is now sandwiched for rotation about the outer surface of the barrel 36. An indexing table locking means 114, similar in construction to the shaft locking means 44, is provided to secure the indexing table 104 in a desired angular orientation with respect to the barrel 36. A reference mark 116 is shown to be inscribed on the skirt 110 to provide a reference point which may vary about the circumference of shaft means 22 depending upon the position of the leveling table 104. The table 104 is dimensioned to support a level, such as an ordinary bubble level, in order to orient the top surface thereof horizontally. Optionally, but preferably, an integral level 118 is associated with the table 104 as a matter of convenience in leveling. In that event, it is preferred that the level 118 includes a cover member for protection during the welding of a flange. The stepped surface is provided with an array of inscription marks 120; the marks being disposed at predetermined locations about the circumferential periphery of that surface wherein each mark corresponds to a standard-size flange. For example, there will normally be an alignment or indexing mark appropriately labeled for eight hole flanges, another for sixteen hole flanges and another for four and twelve hole flanges, as well as any other size which might be encountered. These inscriptions 120 are located in such a manner that registration with the reference mark 116 when the leveling table is in a proper orientation will automatically position the mounting means 30 in the proper orientation to present the flange in a two-holed configuration; shown in FIG. 6 where the top two holes of an eight hole flange lie along the horizontal line H-H.

As respects this automatic feature for providing the proper two-hole configuration, the operation of the jig 10 is simple yet highly efficient. Initially the barrel is pivoted into a work orientation, lying generally along a horizontal line. The adjustment means 28 are employed to level the barrel 36, as measured by level 80. Once the barrel is level the locking axle means 60 is secured to maintain it in that position. This presents the shaft for rotation about a horizontal work axis A-A. Next, the indexing table 104 is rotated concentrically about the barrel 36 in order to level the same along a line normal to the axis A-A, thereby defining a lateral leveling plane L-L as viewed best in FIG. 6. The lateral leveling plane in the desired horizontal orientation is thus generally normal to both the positioning and working planes, the three planes being orthogonal. When lateral leveling is achieved, a task made more convenient by utilizing the integral level 118, the locking handle 114 secures the indexing table in that position. The reference mark 116, which is in inscribed on the skirt 110 and thus moves along with movement of the indexing table, is now located to provide a reference point. The appropriate indexing mark 120 is identified, there being a precise mark for an eight hole flange (e.g., 120a) and another precise mark for a sixteen hole flange (e.g., 120b) and yet another precise mark for a four or twelve hole flange (e.g., 120c). Thus, for the flange 14 (which is shown to be an eight hole flange), the eight-hole indexing mark (i.e., 120a) is identified and the mounting plate is rotated so that the appropriately inscribed mark is in registration with the reference mark 116. The locking handle 44 is then tightened to secure the shaft 38 against rotation. The flange 14 is next placed on the adjustable fixture bolts 96, the nuts 98 tightened to secure the flange in place, and the two-hole configuration shown in FIG. 6 is automatically established. Were a different sized flange (e.g., a sixteen hole flange) to have been the one on which work was to be performed, then selecting the inscription mark corresponding to the sixteen hole flange (i.e., 120b) and registering it with the reference mark would have presented that flange in the proper two-holed configuration. As a matter of manufacturing technique, the series of inscriptions 120 are located initially by empirical means. Preferably, with the apparatus first set up and the reference mark 116 providing the reference point, a variety of flanges are positioned on the plate 32 and measured for the two-holed configuration and the inscriptions made directly on the stepped surface 42. Obviously, the placement of the indexing inscriptions in this fashion is one of convenience only and, provided there is the ability to effectuate registration between a reference and an indexing inscription, the exact placement (i.e., physical location) of these marks is not crucial.

Once the flange 14 has been properly two-holed, the pipe 16 can be positioned to present a welding groove 122 of conventional design. Depending upon the length of pipe 16, it may be necessary or desirable to support its free end by means of an adjustable roller support 18. With the pipe and flange thus oriented, the welder may tack the two together in order to establish an interim bond and then proceed with welding. The welder is free to select the most comfortable welding position and maintain the same simply by rotation of the mounting plate 32, either by means of the rotation handles 100 or the rotation ring 102; or, as discussed below, the jig may be rotated by means of a power source during the welding procedure. When the weld is complete, and the next segment of the piping system is to be fabricated, the abutting flange may be secured in exactly the same way and, by the aforementioned steps, be presented automatically in the proper two-holed configuration.

While the principal purpose of the welding jig 10 is to assist in the welding of a flange to a pipe, it may also be used as a work positioning table. For example, where a rather complex shape is to be made, perhaps including one or more T's, the work may be secured to the mounting plate 32 and the orientation of the jig altered as need be to present the work for most convenient welding. Regardless of the manner in which the shaft means 22 is oriented, it will always provide a work axis A-A normal to the working plane W-W, and the same orthogonal relationship among the three planes W-W, P-P and L-L (albeit rotated due to adjustment of the shaft orientation) can be maintained for alignment and positioning purposes. Accordingly, the device yields a very efficient positioning or work manipulating table for welding at remote locations, regardless of the need to effect a two-holed configuration for a pipe subassembly.

It is also envisioned that the flange mounting means be capable of removal from the shaft means 22 should that be necessary or desirable; for example, to change from one mounting plate design to another or to utilize the shaft for a different purpose. Accordingly, while the flange mounting means 30 is shown in the most preferred embodiment to be integral with, and extend from, the shaft 38, it might equally well be received in collet means. As such collet arrangements are well known in the art, those skilled therein will have no difficulty in designing an appropriate collet system to secure the flange mounting means 30 to the shaft means 22.

Figure 4:
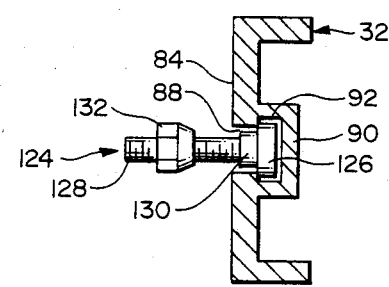
FIG. 4 is a view, similar to FIG. 3, but showing an alternate embodiment for a fixture stud for securing a pipe flange to the welding jig of the present invention where that flange has fixture holes of a reduced size.
Figure 5:
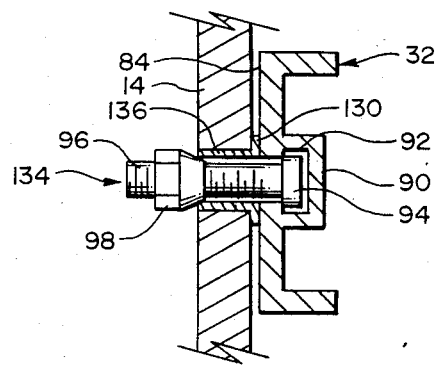
FIG. 5 is a view, similar to FIGS. 3 and 4, showing yet another alternate embodiment for a fixture stud for securing a pipe flange to the welding jig of the present invention, where the fixture holes on that flange are of a larger size.

As is apparent from the foregoing, the welding jig of the present invention is widely adaptable to a considerable range of differing flange sizes, allowing the same to be positioned in a two hole configuration. Additionally, in terms of variations to be encountered, it sometimes occurs that one will be faced with the need to weld or otherwise manipulate a pipe flange where the flange holes are either over- or undersized in the sense that they are larger or smaller than the size of fixture stud 96. FIGS. 4 and 5 illustrate alternate embodiments for the fixture means to accommodate these differing flange hole sizes.

FIG. 4 illustrates a fixture means, designated generally as 124, for secuing a pipe flange 14 to the welding jig of the present invention where the flange holes are of a smaller diameter than those to be accommodated by the fixture means 82. In this instance, the same basic arrangement is employed, wherein a box-type channel 90 is inverted to yield a track 92 within which, now, a head 126 of a threaded fixture bolt 128 is disposed. The fixture bolt 128 is formed with a shoulder 130 intermediate the threaded end portion and head 126, the shoulder 130 having a diameter conforming the bolt for sliding disposition within the track 88. However, the threaded portion of the bolt is stepped down to a smaller diameter in order to accommodate a smaller size hole in a flange. Again, a tapered nut 132 is provided to complete the fastening stud assembly, the tapered nut being a preferred approach to accept still a wider range of variations in holes in the flange member to be welded.

FIG. 5 illustrates another alternate embodiment, but one within the same general vein. There a fixture stud assembly designated generally as 134 is shown securing a flange 14 to the plate 32; in this case, the flange 14 having a fixture hole too large to be accommodated adequately by the fixture bolt 96 in the arrangement of FIG. 3. The stud assembly 134 is substantially identical to that of FIG. 3, save the incorporation of an insert 136, having a circumferential lip or flange 138, disposed within the apertures or bolt holes of the flange 14 and sized to overcome the disparity between the size of the fixture bolt 96 and the aperture in that flange. For example, in order to standardize the welding jig one may select a $\frac{3}{4}''$ fixture bolt and then provide a series of inserts 136 to adapt readily the welding jig to take flanges having bolt holes, for example, of $\frac{7}{8}''$, $1''$, $1\text{-}\frac{1}{8}''$, $1\text{-}\frac{1}{4}''$, $1\text{-}\frac{3}{8}''$, and $1\text{-}\frac{1}{2}''$. In order to provide a corresponding range of inserts, the same would each include a central bore for accommodating the $\frac{3}{4}''$ fixture bolt, and then be sized to have an outer diameter approximately 1/64" less than the inner diameter of the bolt hole on the flange (e.g., about 1-15/64" for a 1-$\frac{1}{4}$" bolt hole).

It sometimes may be advantageous or desirable for the welder to join pipe and flange without the need to undertake manual manipulation of the jig of the present invention. In those instances, a power drive unit is incorporated for the adjustable, controlled rotation of the shaft of the jig and, hence, the flange secured thereto. FIG. 7 illustrates in a partly schematic sense a suitable approach to that end. The power drive unit of FIG. 7, designated generally as 140, is most preferably comprised of an hydraulic motor 142; it being remembered that the principal environment for use of the instant device is at remote field locations. Hence, for example, the vehicle supporting or transporting the jig 10 may be used to drive the same via the hydraulic motor 142. A gear reducer is also preferably included within the power drive unit 140 to interface the motor with an extended shaft 146, since the preferred hydraulic motors operate at too great a revolutionary displacement for most welding purposes. A suitable coupling 148 bridges the motor and gear reducer as is generally conventional. The output from the gear reducer is provided through an output shaft 150, preferably engaged with the jig through the extended shaft 146 via, e.g., a spline arrangement. Indeed, the extended shaft 146 may be formed as an element separate from the overall shaft 22 of the jig and itself splined thereto in order that the same may be added in the event the power drive 140 is desired or eliminated should that be a preferable course of action. Regardless, it has been determined that a range of from about 0.05 to about 2.0 revolutions per minute at the plate 32 will normally accommodate virtually any field-welding requirements.

While the invention has now been described with reference to certain preferred embodiments thereof, those skilled in the art will appreciate that various modifications, changes, substitutions and omissions may be made without departing from the spirit thereof. Accordingly, it is intended that the scope of the present invention be limited solely by that of the claims granted herein.

What is claimed is:

1. A portable welding jig providing work positioning and manipulating means configured for pipe flange welding at a remote field location and capable of establishing automatically a two-holed flange configuration, said welding jig comprising:
    a. a base;
    b. rotatable shaft means comprising a sleeve receiving a shaft internally thereof for rotation therein about a work axis, said shaft means being pivotally secured to said base at a pivot joint disposed proximate a first end of said shaft means and adjustably secured to said base at a generally vertically adjustable fixture means proximate the second end of said shaft means, whereby vertical adjustment of said second end will cause generally arcuate movement of said shaft means within a positioning plane containing said work axis;
    c. flange mounting means secured to said second end of said shaft means, including a flange mounting plate extending generally radially outward therefrom defining a working plane normal to said positioning plane and adjustable flange fasteners for securing a selected flange to said plate for rotation about said work axis;
    d. indexing means for locating said selected flange, borne on said plate, in a two-holed configuration, including reference means for presenting a reference inscription at a reference point corresponding to lateral leveling of a leveling plane generally normal to said positioning and working planes and an array of indexing inscriptions associated with said shaft, one of each of said indexing inscriptions corresponding to a predetermined angular orientation of said plate characteristic of a two-holed configuration for a respective standard pipe flange, whereby mating the indexing inscription corresponding to said selected flange with said reference inscription at said reference point presents said selected flange in a two-holed configuration on said plate in said working plane.

2. The welding jig of claim 1, wherein said indexing means comprises an indexing ring rotatable concentrically about said shaft means and bearing said reference inscription and an indexing level support means secured to said indexing ring for receiving a level to detect lateral leveling of said leveling plane.

3. The welding jig of claim 2, wherein said array of indexing inscriptions is disposed about said shaft.

4. The welding jig of claim 3, wherein said vertically adjustable fixture means is comprised of a threaded bolt pivotally secured to said sleeve at a first end of said bolt and disposed through an aperture in said base at its other end and a nut threaded for rotation about said bolt in operative engagement with said base, whereby rotation of said nut causes vertical displacement of said bolt.

5. The welding jig of claim 3, wherein said adjustable flange fasteners are comprised of first and second bolt means captured for sliding receipt in slots formed in said plate.

6. The welding jig of claim 5, wherein said plate includes inverted channel means on the rear side of thereof, disposed in registration with said slots to define a track within which the heads of said bolts are captured for sliding receipt therein.

7. The welding jig of claim 6, wherein the face of said plate receiving said flange is inscribed with a plurality of spaced centering marks for locating said flange on said plate for concentric rotation about said work axis.

8. The welding jig of claim 1, further comprising drive means for said rotatable shaft means.

9. The welding jig of claim 8, wherein said drive means is comprised of an hydraulic motor and gear reducer.

10. A portable welding jig providing work positioning and manipulating means configured for pipe flange welding at a remote field location and capable of establishing automatically a two-holed flange configuration, said welding jig comprising:
    a. rotatable shaft means adjustably secured to support means, having a longitudinal work axis about which said shaft may rotate;
    b. adjustment means for orienting said shaft means in a positioning plane containing said work axis;
    c. flange mounting means depending from the distal end of said shaft means for receiving a flange and presenting same for rotation about said work axis in a working plane generally normal to said positioning plane;
    d. indexing means for locating a flange borne upon said flange mounting means in a two-holed configuration within said working plane, said indexing means comprising:
        i. means for detecting lateral leveling with respect to said work axis;
        ii. an indexing ring rotatable concentrically about said shaft means for supporting level means in operative engagement with said indexing ring;
        iii. an indexing table secured to said indexing ring for supporting said level means;
        iv. reference means for presenting a reference inscription at a reference point and corresponding to lateral leveling in a leveling plane generally normal to said positioning and working planes; and,
        v. an array of indexing inscriptions associated with said shaft means and disposed for rotation with said shaft means, one of each of said indexing inscriptions corresponding to a predetermined angular orientation of said flange mounting means characteristic of a two-holed configuration for respective standard pipe flange;

wherein mating the selected one of said indexing inscriptions corresponding to the flange to be welded in registration with said reference inscription presents said flange in a two-holed configuration on said flange mounting means.

* * * * *